United States Patent
Oi et al.

(10) Patent No.: US 7,317,690 B2
(45) Date of Patent: Jan. 8, 2008

(54) METHOD OF CONSTRUCTING NETWORK TOPOLOGY AND INTERFACE CIRCUIT

(75) Inventors: Kenji Oi, Kasugai (JP); Takashi Shimizu, Kasugai (JP); Hirotaka Ueno, Kasugai (JP); Hiroshi Takase, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 1222 days.

(21) Appl. No.: 09/968,519

(22) Filed: Oct. 2, 2001

(65) Prior Publication Data

US 2002/0019868 A1 Feb. 14, 2002

Related U.S. Application Data (63) Continuation of application No. PCT/JP00/01470, filed on Mar. 10, 2000.

(30) Foreign Application Priority Data

Jun. 25, 1999 (JP) ................................. 11-180030

(51) Int. Cl.
*G01R 31/08* (2006.01)
*G06F 11/00* (2006.01)

(52) U.S. Cl. .................. 370/249; 370/241; 370/248; 370/257; 714/25

(58) Field of Classification Search ................ 370/257, 370/447, 461, 462
See application file for complete search history.

(56) References Cited

U.S. PATENT DOCUMENTS 5,784,557 A 7/1998 Oprescu
5,933,656 A * 8/1999 Hansen ..................... 710/62

FOREIGN PATENT DOCUMENTS

| EP | 0 964 552 | 12/1999 |
|---|---|---|
| JP | 1-125147 | 5/1989 |
| JP | 4-216240 | 8/1992 |
| JP | 11-345193 | 12/1999 |

OTHER PUBLICATIONS

IEEE Standard for a High Performance Serial Bus : IEEE STD 1394-1995, Dec. 1995 (IEEE Computer Society), See the contents of Annex E, section 3.2 "Tree Identity".

* cited by examiner

*Primary Examiner*—Wing Chan
*Assistant Examiner*—Juh-Yih Shue
(74) *Attorney, Agent, or Firm*—Staas & Halsey LLP (57) ABSTRACT

An interface circuit that can disconnect a loop connection among nodes. The interface circuit includes ports, which are connected to bus cables, a state machine and a port controller, which is connected to the ports and the state machine. The state machine determines that a loop connection exists when a process in a predetermined state has been stacked for a predetermined time. When a loop connection exists, the port controller electrically disconnects a port on the loop.

18 Claims, 7 Drawing Sheets

METHOD OF CONSTRUCTING NETWORK TOPOLOGY AND INTERFACE CIRCUIT

CROSS-REFERENCE TO RELATED APPLICATION

This application is a continuation of PCT Application No. PCT/JP00/01470 filed on Mar. 10, 2000.

BACKGROUND OF THE INVENTION

The present invention relates to a method of constructing a network topology, and, more particularly, to a network topology constructing method and interface circuit which are suitable for the standards of IEEE 1394.

According to IEEE 1394, packet transfer is controlled by an interface circuit and a state machine of each node. The individual nodes are connected to one another via ports and buses to form a network topology. When bus resetting occurs at one node, each node executes a bus initialization step. In a bus reset state (bus reset start to bus reset wait) of each state machine, topology information registered in each node is erased by the bus initialization step.

When the bus initialization step ends, the state machine of each node goes into a tree ID state. In the tree ID state, the state machine of each node sees the topology as a tree and identifies the topology or the connection state of each node. That is, first an adequate node is selected as a root node and the other nodes are regarded as branches or leaves.

Figure 1:
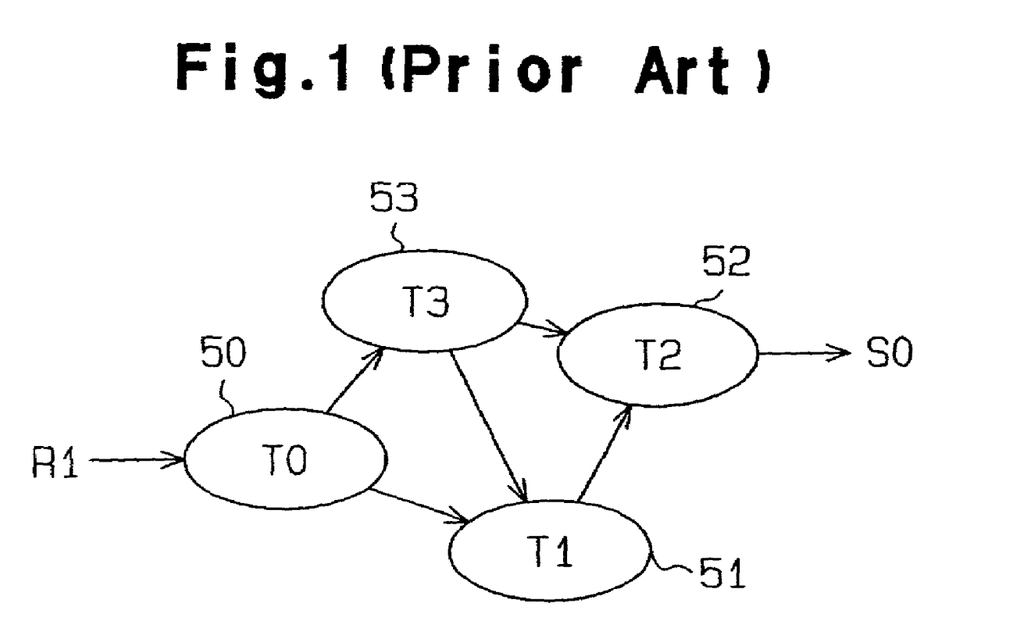
FIG. 1 is an explanatory diagram of a tree ID state of a state machine according to the prior art.

Specifically, the tree ID state that conforms to the draft of IEEE 1394 includes a T0 state (tree ID state) 50, a T1 state (child handshake) 51, a T2 state (parent handshake) 52 and a T3 state 53, as shown in FIG. 1.

When the process of a bus reset wait R1 is finished, each state machine goes to the T0 state 50. In the T0 state 50, a parent notify signal requesting a parent node is supplied to ports of the node. The T0 state 50 continues until there remains one port that has not received the parent notify signal. Then, each state machine moves to the T1 state 51. Note that because a leaf node (end node) has only one port to be connected to another node, the state machine of the leaf node immediately moves to the T1 state 51 from the T0 state 50.

In the T1 state 51, the state machine of the first node that has received the parent notify signal sends the state machine of the second node, or the sender, a child notify signal indicating that the node is acknowledged as its own child.

In the next T2 state 52, the state machine of the second node sends the parent notify signal to the ports of the third node that have not received the parent notify signal and waits for the child notify signal to be supplied to its port from the third node. When the child notify signal is input to that port, the tree identification step ends. In the T3 state 53, arbitration at the time of tree identification is performed.

The parent notify signal is supplied from a leaf node to a branch node (a node along the way). When there remains one port of a branch node that has not received the parent notify signal, the state machine of the branch node sends the child notify signal to the leaf node and sends the parent notify signal to another node from the remaining one port. As this work is repeated and the last node that has received the parent notify signal and returned the child notify signal is set as the root node, each node identifies the parent-children relationship.

When the tree identification step ends, the state machine of each node goes to a self ID state 50 and performs a self identification step. In the self identification step, a physical ID to be used as the address of each node is selected. Accordingly, management information about the bus connection is prepared. When the self identification step is completed, normal packet transfer becomes possible among the individual nodes.

The packet transfer system that is defined by the IEEE 1394 standards does not allow a loop-like topology. When a topology is like a loop, for example, there exists no root node having a single port that has not received the parent notify signal at the time of identifying the topology, so that the identification process is stacked in the T0 state 50. Because an out-of-loop node that does not exist on the loop cannot receive the child notify signal from a node on the loop, the identification process at the out-of-loop node is stacked in the T2 state 52. When stacking occurs in the T2 state 52 for a predetermined time, the out-of-loop node retries the bus initialization, but the topology has not been changed so the stacking occurs again. Therefore, topology identification is not completed.

In this case, a user must reconnect the nodes to overcome the problem of the loop connection. When there are multiple nodes or when nodes are arranged over a plurality of rooms, however, the connection work takes much time and labor.

SUMMARY OF THE INVENTION

It is an object of the present invention to provide a method of constructing a network topology that cancels an illegitimate connection among nodes without bothering users.

To achieve the object, the present invention provides a method of constructing a topology having a plurality of nodes. The method includes a step of diagnosing the presence of a loop connection of the topology, and a disconnection step of disconnecting a part of the loop connection based on the diagnosis result.

According to another aspect of the present invention, there is provided an interface circuit provided at each of a plurality of nodes connected to one another by bus cables. The interface circuit includes ports to be connected to the bus cables, a state machine for diagnosing that a loop connection exists when a process in a predetermined state has been stacked for a predetermined time, and a port controller, connected to the ports and the state machine, for, when the state machine has diagnosed that a loop connection exists, electrically disconnecting a port on that loop.

The features of the invention that are believed to be novel are set forth with particularity in the appended claims. The invention, together with the object and advantages thereof, may best be understood by reference to the following description of the presently preferred embodiments together with the accompanying drawings.

BRIEF DESCRIPTION OF THE DRAWINGS

FIGS. 5*a* to 5*g* are diagrams for explaining the disconnection step that is performed according to the flowchart in FIG. 4;

FIGS. 6a to 6j are diagrams for explaining a disconnection step according to a second embodiment; and FIGS. 7a to 7d are diagrams for explaining a disconnection step according to a third embodiment.

DETAILED DESCRIPTION OF THE PREFERRED EMBODIMENTS

The first embodiment of the present invention is described below with reference to FIGS. 2 to 5.

FIG. 5a shows a topology which has a plurality of nodes A1 to D1 connected together via IEEE 1394 bus cables 1a-1d. The nodes A1-D1 include, for example, a personal computer, a printer, a digital video camera and a settop box.

The node D1 is connected to the node B1 via the bus cable 1a. The node B1 is connected to the node C1 via the bus cable 1b and is connected to the node A1 via the bus cable 1d. The node C1 is connected to the node A1 via the bus cable 1c. The nodes A1 to C1 and the bus cables 1b to 1d form a loop.

Figure 2:
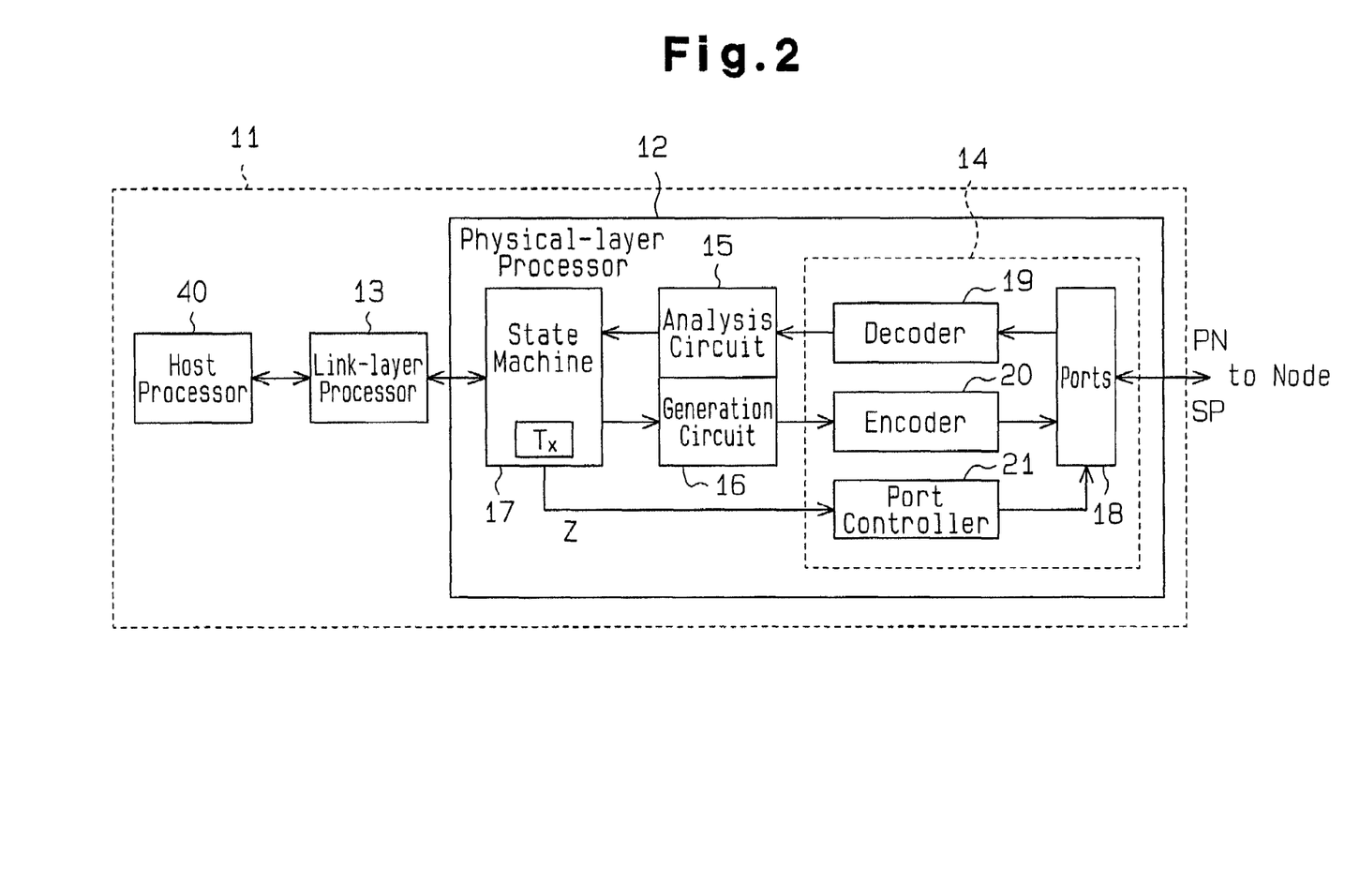
FIG. 2 is a schematic block circuit diagram of an interface circuit according to a first embodiment of the present invention.

Each of the nodes A1 to D1 has an interface circuit 11 shown in FIG. 2. The interface circuit 11 has a physical-layer processor 12, a link-layer processor 13 and a host processor 40. The physical-layer processor 12 includes a port unit 14, an analysis circuit 15, a generation circuit 16 and a state machine 17. The port unit 14 has ports 18, a decoder 19, an encoder 20 and a port controller 21. A single node can be provided with a maximum of eight ports 18. The port unit 14 is provided parallel to the ports 18.

A packet that is transferred from another node is supplied to the state machine 17 via the ports 18, the decoder 19 and the analysis circuit 15. The state machine 17 supplies the packet to the link-layer processor 13. The state machine 17 sends the packet, transferred from the first node, to the second node via the generation circuit 16, the encoder 20 and the ports 18.

Further, the state machine 17 receives a packet supplied from the link-layer processor 13 and sends the packet to another node via the generation circuit 16, the encoder 20 and the ports 18.

By referring to header information of a packet supplied from the physical-layer processor 12, the link-layer processor 13 checks the destination of that packet. When the packet is addressed to its node, the link-layer processor 13 supplies data stored in the packet to the host processor 40. The link-layer processor 13 receives data from the host processor 40 and supplies the data to the physical-layer processor 12.

Figure 3:
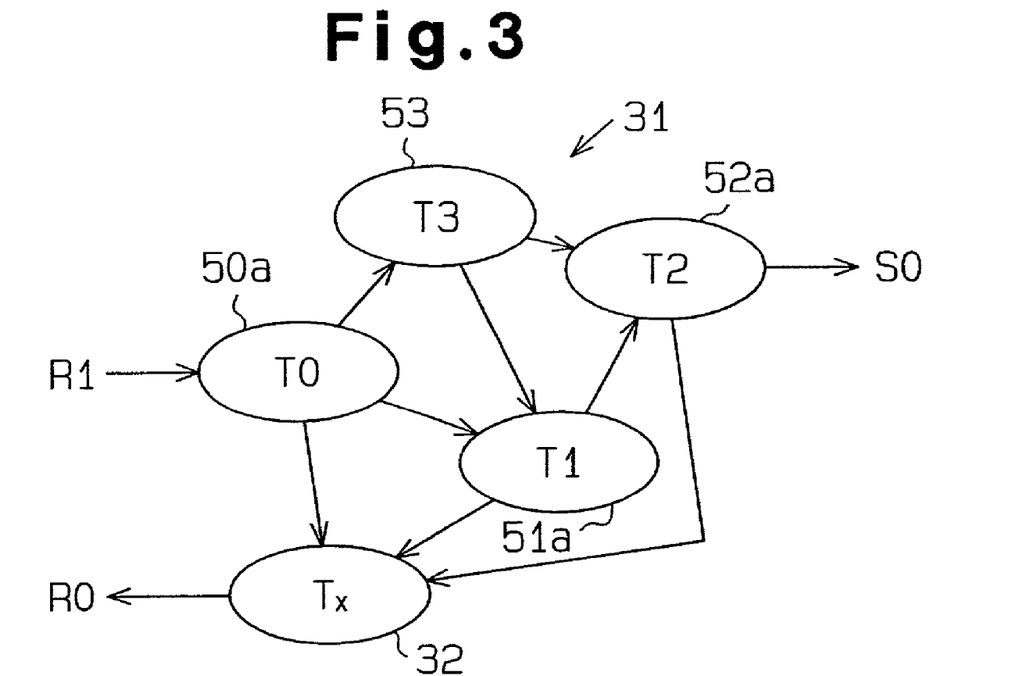
FIG. 3 is a diagram of a tree ID state according to the first embodiment of the present invention.

The state machine 17 has a tree ID state 31, a bus reset state (bus reset start R0 and bus reset wait R1) and a self ID state S0 shown in FIG. 3.

The tree ID state 31 includes a T0 state (tree ID state) 50a, a T1 state (child handshake) 51a, a T2 state (parent handshake) 52a, a T3 state 53 and a Tx state 32 as a diagnosis state.

When the state of stacking continues for a predetermined time in the T0 state 50a, the T1 state 51a or the T2 state 52a, the state machine 17 moves to the Tx state 32.

Figure 4:
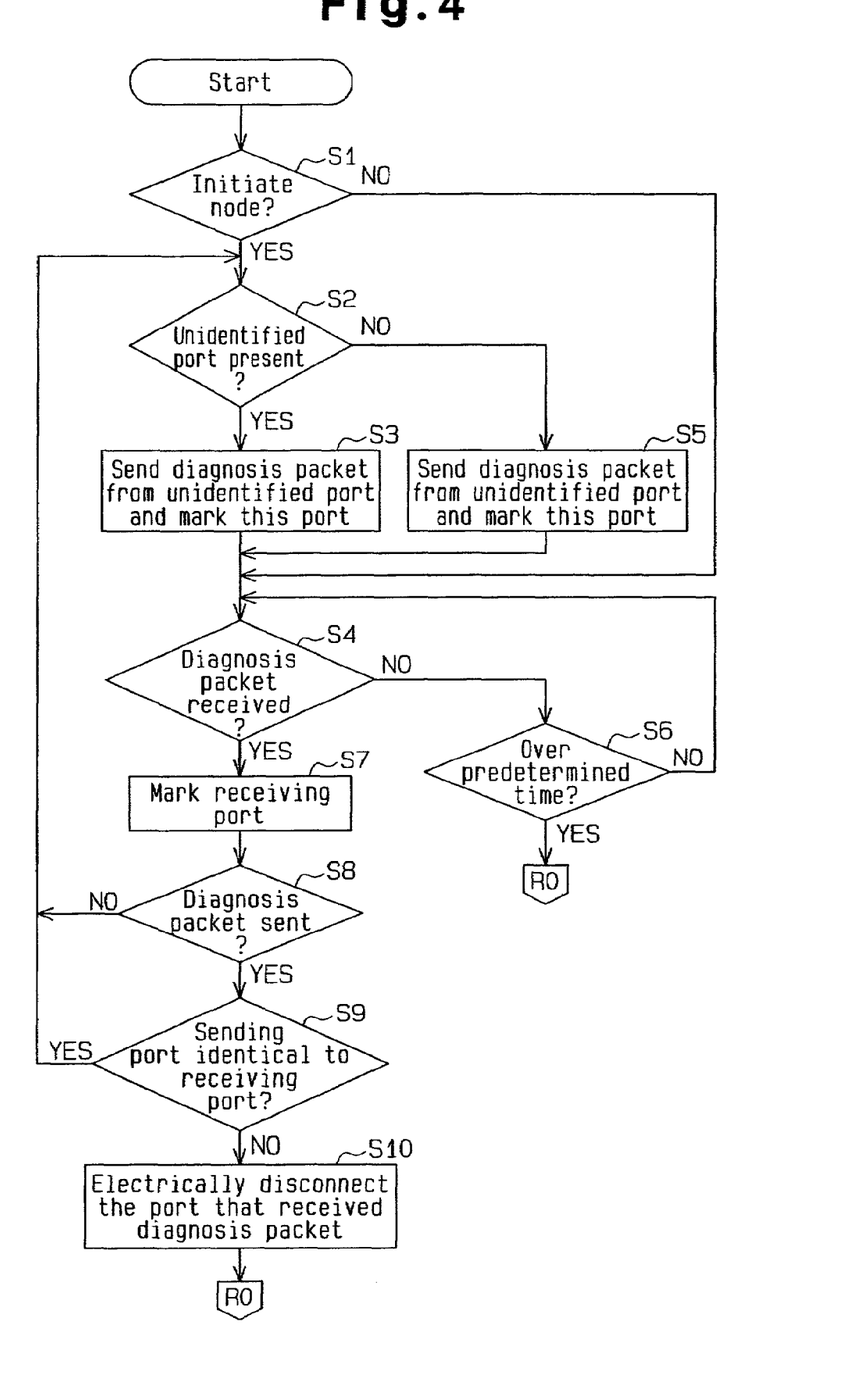
FIG. 4 is a flowchart of a disconnection step that is performed in a Tx state in FIG. 3.
Figure 5:
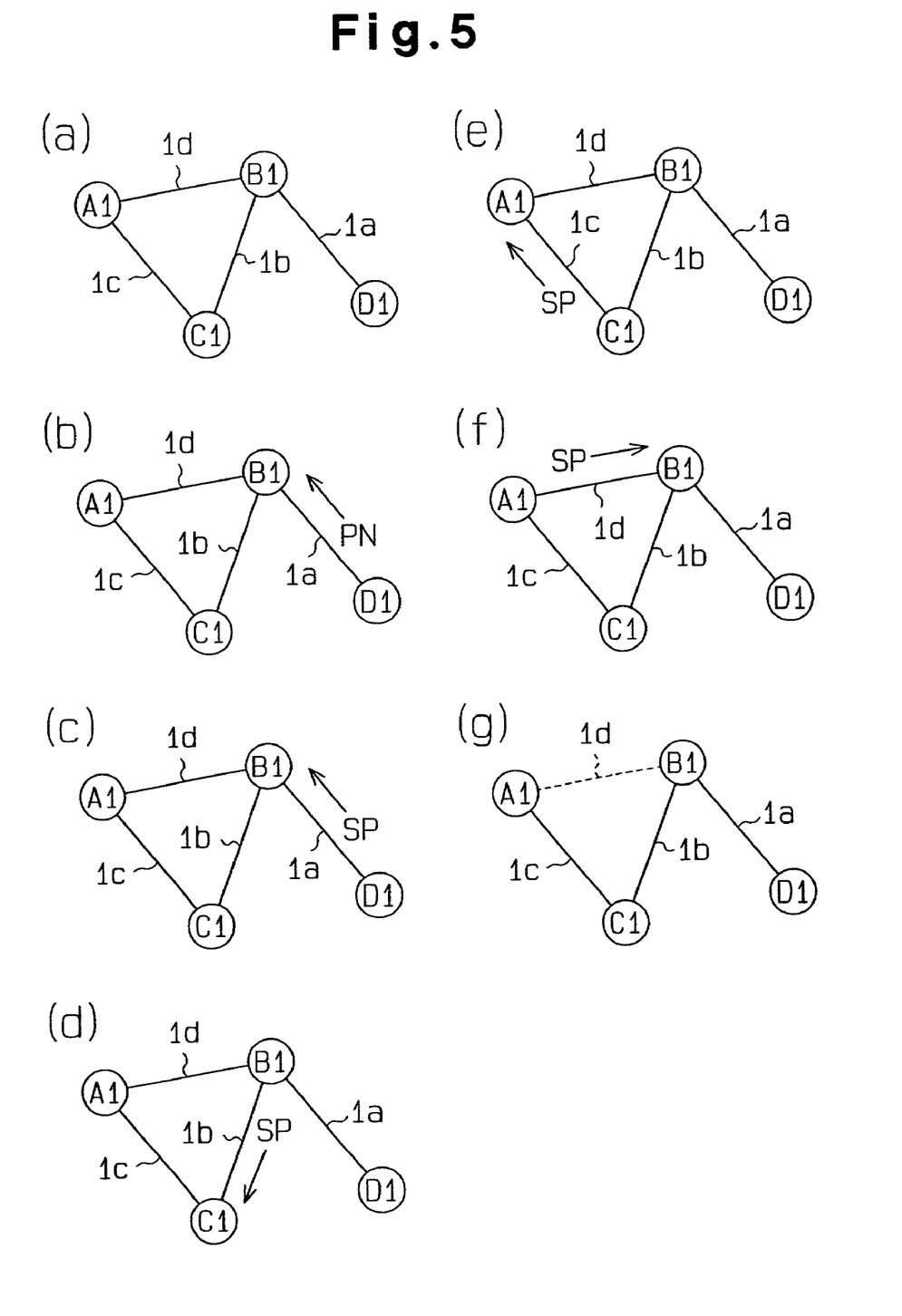

The state machine 17 executes a disconnection process in the Tx state 32 according to a flowchart illustrated in FIG. 4.

In step S1, the state machine 17 determines whether its node is a specific node or an initiate node. The initiate node is an origin node which has caused bus resetting. When it is determined that the node is an initiate node, the process proceeds to step S2.

In step S2, it is determined whether its node has any unmarked port 18 (unidentified port) remaining. Note that marking is carried out at the time of sending and receiving a diagnosis packet SP and all the ports are not marked in the initial stage of topology identification. When there remains an unidentified port 18 in the local node, the process proceeds to step S5.

In step S3, the state machine 17 sends the diagnosis packet SP from an unidentified port 18 and marks that port 18. Then, the process proceeds to step S4. In a case where there are plural unidentified ports 18, the state machine 17 arbitrarily selects one of them, sends it the diagnosis packet SP and marks that port 18.

When the local node has no unidentified port 18 in step S2, the process goes to step S5.

In step S5, the state machine 17 sends the diagnosis packet SP from an identified port 18, marks that port 18 and moves to step S4.

When the result of the decision in step S1 is NO, on the other hand, the process proceeds to step S4.

In step S4, the state machine 17 determines whether it has received the diagnosis packet SP. When the diagnosis packet SP has not been received, the process goes to step S6.

In step S6, the state machine 17 determines whether a predetermined time has passed since the reception of the last diagnosis packet SP. When the predetermined has not passed, the process returns to step S4. When the predetermined has passed, on the other hand, the process proceeds to the bus reset start R0 of the bus reset state. As a result, bus resetting is executed. It is to be noted that the predetermined time in step S6 is set to a minimum value which can be regarded as the occurrence of an abnormality in the transmission and reception of the diagnosis packet SP. When it is determined in step S6 that the transmission and reception of the diagnosis packet SP are abnormal, the process in FIG. 4 is prevented from being stacked in step S4.

When the diagnosis packet SP has been received in step S4, the process moves to step S7.

In step S7, the state machine 17 marks the port 18 that has received the diagnosis packet SP. Then, the process proceeds to step S8.

In step S8, the state machine 17 determines whether the diagnosis packet SP has been transmitted in step S3 or step S5. When the diagnosis packet SP has not been transmitted, the process returns to step S2. When the diagnosis packet SP has been transmitted, the process goes to step S9.

In step S9, the state machine 17 determines whether the port 18 which has received the diagnosis packet SP and has been marked in step S7 is identical to the port 18 which has transmitted the diagnosis packet SP and has been marked in step S3. When both ports 18 differ from each other, a loop connection which is formed by the bus cables respectively connected to both ports 18 exists in the topology. When both ports 18 differ from each other, therefore, the process proceeds to step S10. When both ports 18 are the same, on the other hand, the process returns to step S2.

In step S10, the state machine 17 sends the port controller 21 a disconnect signal Z for electrically disconnecting one of the ports 18 that have been marked in steps S3 and S7. In response to the disconnect signal Z, the port controller 21 electrically disconnects the port 18 (marked in step S7) that has received the diagnosis packet SP. The port controller 21 is, for example, a register that is not initialized at the time of bus initialization.

After the process of step S10, the process proceeds to the bus reset state (bus reset start R0). As a result, bus resetting is executed.

The following discusses the operation of the interface circuit 11.

Here, the node D1 in FIG. 5a is the initiate node. Suppose that bus resetting occurs in the node D1. Then, each of the nodes A1 to D1 enters the bus reset state (bus reset start R0 to bus reset wait R1) and performs bus initialization. This causes information about the topology to be erased in each of the nodes A1 to D1.

After the bus initialization, each of the nodes A1 to D1 goes to the tree ID state 31 from the bus reset wait R1. In the tree ID state 31, tree identification is carried out.

First, each of the nodes A1 to D1 goes to the T0 state 50a. Then, the node D1 or a leaf node immediately moves to the T2 state 52a. Then, the node D1 sends a parent notify signal PN to the node B1 (FIG. 5b).

As the topology in FIG. 5b is in a loop, however, there is no node having a single port that does not receive the parent notify signal PN. Therefore, the process of each of the nodes A1 to D1 is stacked in the T0 state 50a. Then, the node B1 does not return a child notify signal to the node D1, so that the process of the node D1 is stacked in the T2 state 52a.

When the stacked state of each of the nodes A1 to D1 continues for a predetermined time in the T0 state 50a or the T2 state 52a, therefore, each of the nodes A1 to D1 proceeds to the Tx state 32.

The state machine 17 of the node D1 determines in step S1 that the node D1 is the initiate node. Next, the state machine 17 determines in step S2 that there is an unidentified port 18 in the ports 18 of the node D1.

In step S3, the state machine 17 of the node D1 sends the diagnosis packet SP to the node B1 from the unidentified port 18 (FIG. 5c) and marks the port 18.

Meanwhile, the state machines 17 of the nodes A1 to C1 determine in step S1 that their nodes are not the initiate node.

Then, the state machine 17 of the node B1 determines whether it has received the diagnosis packet SP from the node D1 (step S4) and marks the port 18 that has received the diagnosis packet SP (step S7). Thereafter, the state machine 17 of the node B1 determines that it has not sent the diagnosis packet SP (step S8) and determines that there is an unidentified port 18 (step S2).

Then, as shown in FIG. 5d, through the process of step S3, the state machine 17 of the node B1 sends the diagnosis packet SP to the node C1 from an unidentified port 18 of the node B1 and marks that port 18. It is assumed that one of two unidentified ports 18 of the node B1 which is arbitrarily connected to the node C1 has been selected.

The state machine 17 of the node C1 performs the processes of step S4, step S7, step S8 and step S2. Then, in step S3, the state machine 17 of the node C1 sends the diagnosis packet SP to the node A1 from an unidentified port 18 of the node C1 and marks that port 18 (FIG. 5e).

The state machine 17 of the node A1 executes the processes of step S4, step S7, step S8 and step S2. Then, in step S3, the state machine 17 of the node A1 sends the diagnosis packet SP to the node B1 from an unidentified port 18 of the node A1 and marks that port 18 (FIG. 5f).

The state machine 17 of the node B1 determines that it has received the diagnosis packet SP from the node A1 (step S4) and marks that port 18 (step S7). Further, the state machine 17 determines that the node B1 has transmitted the diagnosis packet SP (step S8). Then, through the process of step S9, the state machine 17 of the node B1 determines that the port 18 which has transmitted the diagnosis packet SP differs from the port 18 which has received the diagnosis packet SP.

Then, the state machine 17 sends the disconnect signal Z to the port controller 21 (step S10). This disconnect signal Z electrically disconnects the bus cable 1d connected to the port 18 which has received the diagnosis packet SP (FIG. 5g). This cancels the loop of the topology.

When the topology is reconstructed this way, first, the node B1 executes bus resetting and each of the nodes A1 to D1 performs bus initialization again in accordance with that bus resetting.

After those bus initializations are completed, each of the nodes A1 to D1 enters the tree ID state 31 again. In the current tree ID state 31, tree identification is completed normally. Through the tree identification, the root node is determined and the parent-children relationship is identified at the individual nodes A1 to D1.

After the tree identification, each of the nodes A1 to D1 goes to the self ID state. In the self ID state, self identification is performed and management information about bus connection is prepared. Through the above-described processes, packet transfer is properly executed among the nodes A1 to D1.

The interface circuit 11 of the first embodiment and the system thereof provide the following advantages.

(1) The state machine 17 of each node automatically checks the ports 18 on a loop and automatically disconnects a port 18 of an arbitrary node, thereby canceling the loop state. Accordingly, the topology that is permitted by the IEEE 1394 standards is constructed and packet transfer is performed properly. Therefore, a user is relieved of a troublesome work of carefully constructing a topology in such a way as not to form a loop or reconnecting the nodes.

(2) The tree ID state 31 that includes the Tx state 32 can be prepared easily.

(3) The port unit 14 that includes the port controller 21 can also be prepared easily.

(4) As the first diagnosis packet SP is output only from the initiate node (node D1), the diagnosis packet SP is not output from plural nodes at the same time, thus preventing the occurrence of malfunction.

The first embodiment may be modified as follows.

The present invention is adaptable to a complicated topology which has a plurality of loops.

Figure 6:
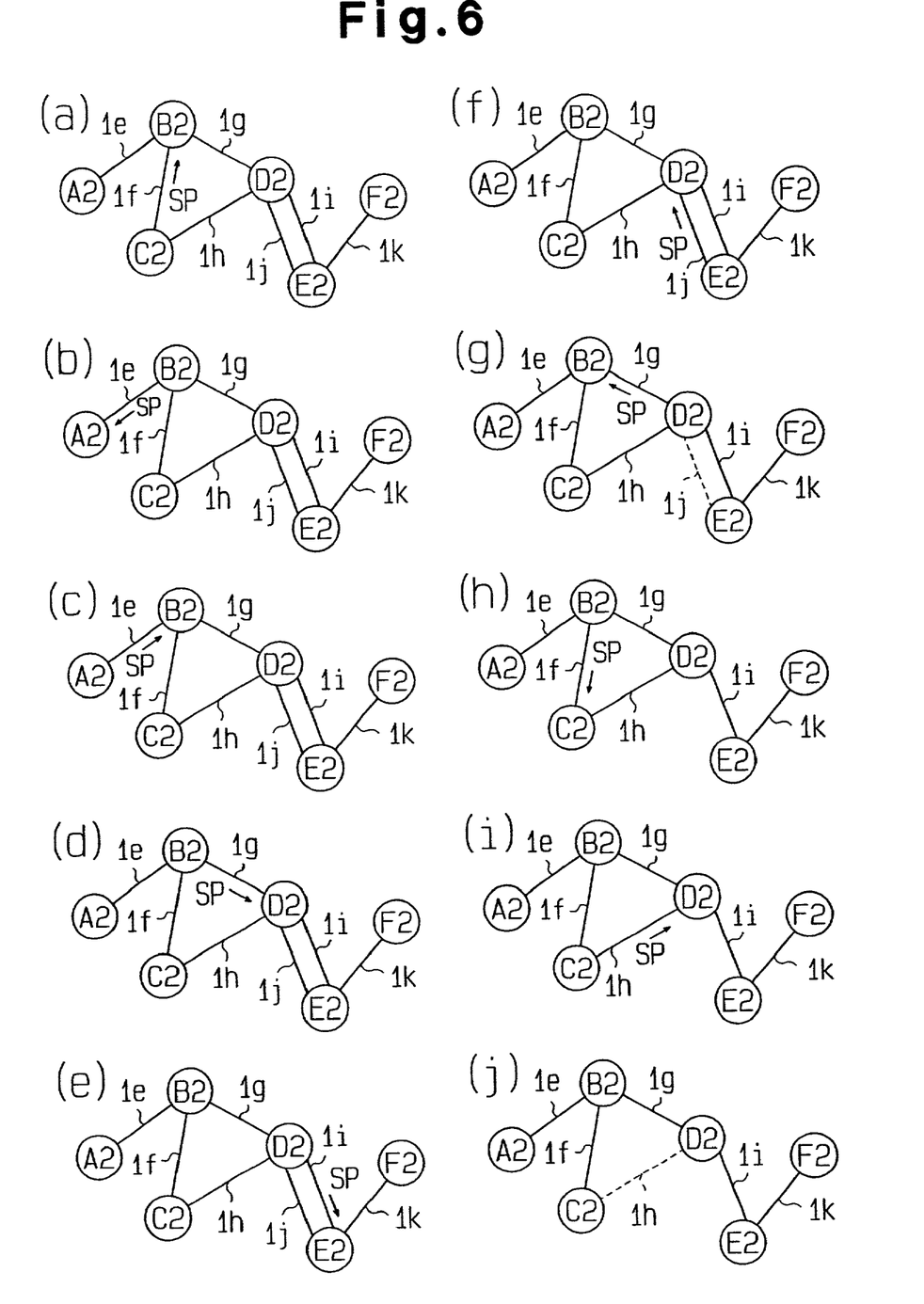

For example, in a network topology in FIG. 6a, a node A2 is connected to a node B2 via a bus cable 1e. The node B2 is connected to nodes C2 and D2 via bus cables 1f and 1g. The node C2 is connected to the node D2 via a bus cable 1h. The node D2 is connected to a node E2 via bus cables 1i and 1j. The node E2 is connected to a node F2 via a bus cable 1k. Therefore, the nodes B2, C2 and D2 and the bus cables 1f to 1h form a first loop, and the nodes D2 and E2 and the bus cables 1i and 1j form a second loop. Each of the nodes A2 to F2 has the interface circuit 11.

The following discusses a process of reconstructing a topology with the node C2 as the initiate node.

First, the node C2 performs bus resetting. Then, each of the nodes A2 to F2 executes bus initialization followed with tree identification. Then, the processes of the nodes B2 to E2 are stacked in the T0 state 50a, and the processes of the nodes A2 and F2 are stacked in the T2 state 52a. As a result, the process of each of the nodes A2 to F2 proceeds to the Tx state 32.

In the Tx state 32, first, as shown in FIG. 6a, the state machine 17 of the node C2 arbitrarily selects one of unidentified ports 18 of the node C2, sends the diagnosis packet SP to the node B2 from the selected port 18 and marks that port 18 (step S3).

When the state machine 17 of the node B2 receives the diagnosis packet SP, as shown in FIG. 6b, the state machine 17 of the node B2 sends the diagnosis packet SP to the node A2 from a selected, unidentified port 18 of the node B2 and marks that port 18 (step S3).

When the state machine 17 of the node A2 receives the diagnosis packet SP, the state machine 17 of the node A2 sends the diagnosis packet SP to the node B2 from an identified port 18 because there is no unidentified port 18 in the node A2, and marks that port 18 (FIG. 6c, step S5).

The state machine 17 of the node B2 determines that the port 18 which has received the diagnosis packet SP is identical to the port 18 which has transmitted the diagnosis packet SP, and the state machine 17 of the node B2 determines that the ports 18 of the node A2 are not on the loop (step S9).

Then, the state machine 17 of the node B2 sends the diagnosis packet SP to the node D2 from an unidentified port 18 and marks that port 18 (FIG. 6d, step S3).

The state machine 17 of the node D2 receives the diagnosis packet SP and, as shown in FIG. 6b, selects the port 18 that is connected to the bus cable 1i. The diagnosis packet SP is sent to the node E2 from that port 18, and the port 18 is marked (step S3).

The state machine 17 of the node E2 receives the diagnosis packet SP, sends the diagnosis packet SP to the node D2 from an identified port 18 connected to the bus cable 1j, and marks that port 18 (FIG. 6f, step S3).

Then, the state machine 17 of the node D2 determines that the port 18 which has received the diagnosis packet SP differs from the port 18 which has transmitted the diagnosis packet SP, and identifies that both ports 18 are on the loop (step S9). Then, the state machine 17 sends the disconnect signal Z to the port controller 21 of the node D2 (step S10). As indicated by a broken line in FIG. 6g, the port controller 21 electrically disconnects the bus cable 1j. As a result, the second loop of the topology is canceled.

As the disconnection of the bus cable 1j changes the topology, the nodes A2 to F2 execute bus initialization with the node D2 as the initiate node. Because the first loop has not been canceled yet, however, the processes of the nodes B2 to D2 are stacked in the T0 state 50a, and the processes of the nodes A2, E2 and F2 are stacked in the T2 state 52a. Therefore, the process of each of the nodes A2 to F2 proceeds to the Tx state 32.

The state machine 17 of the node D2 selects a port 18 of the node B2, sends the diagnosis packet SP to the node B2 from that port 18, and marks the port 18 (FIG. 6g, step S3).

The state machine 17 of the node B2 receives the diagnosis packet SP, selects a port 18 of the node C2, sends the diagnosis packet SP to the node C2 from that port 18, and marks the port 18 (FIG. 6h, step S3).

The state machine 17 of the node C2 receives the diagnosis packet SP, sends the diagnosis packet SP to the node D2 from an unidentified port 18, and marks that port 18 (FIG. 6i, step S3).

Then, the state machine 17 of the node D2 determines that the port 18 which has received the diagnosis packet SP differs from the port 18 which has transmitted the diagnosis packet SP, and identifies that both ports 18 are on the loop (step S9). Then, the state machine 17 sends the disconnect signal Z to the port controller 21 of the node D2 (step S10). As indicated by a broken line in FIG. 6j, the port controller 21 electrically disconnects the bus cable 1h. As a result, the first loop of the topology is canceled.

As the disconnection of the bus cable 1j changes the topology, the nodes A2 to F2 execute bus initialization with the node D2 as the initiate node. Because the first and second loops have been canceled at this time, bus initialization, tree identification and self identification are properly completed thereafter. Therefore, normal packet transfer becomes possible among the individual nodes A2 to F2.

As apparent from the above, for a topology having a plurality of loops, a topology with canceled loops is reconstructed in a similar manner to the first embodiment.

When there are plural unidentified ports 18, the priority order may be set to the ports 18 in advance. In this case, that port which has a high priority remains and those ports which have a low priority are disconnected.

The following process may be carried out even when a topology is changed after a loop is canceled. When an abnormality occurs on a port 18 which has not been disconnected or the bus cable that is connected to that port 18, for example, the state machine 17 detects a change in topology and executes bus resetting. Then, the state machine 17 renders the port 18 that has been disconnected before in an electrically-connected state again. An abnormality occurs when a bus cable is physically disconnected or when a predetermined or greater amount of errors is detected at the time of packet transfer. The rendering permits switching to the normal connection without requiring the user's reconnection of buses even if an abnormality occurs in bus cable connection after a loop is canceled.

Figure 7:
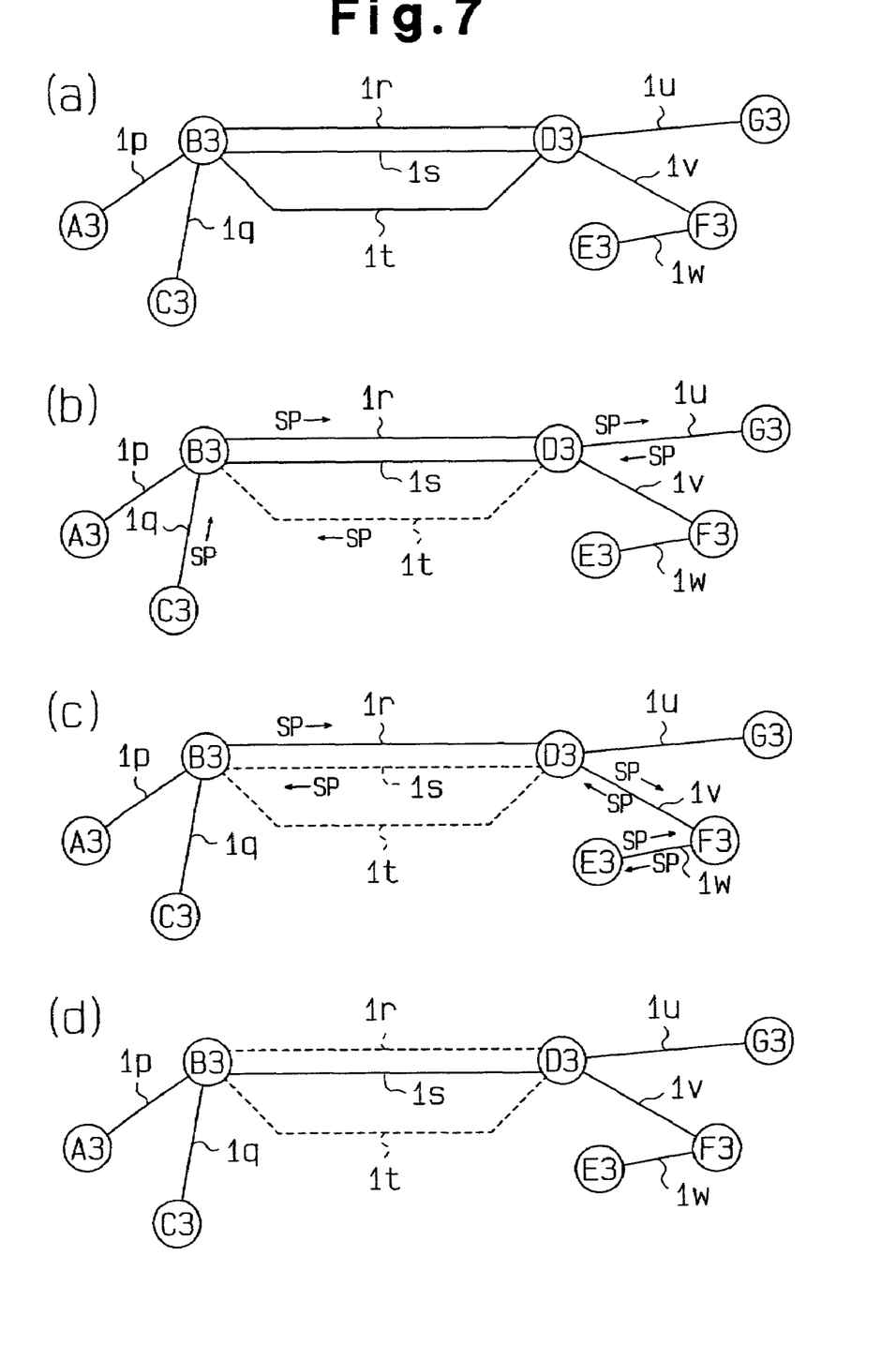

With respect to a topology which has a loop intentionally formed beforehand, the above-described loop cancellation may be performed. When an abnormality occurs in a bus (cable) that has not been disconnected after loop cancellation, the disconnected bus (cable) may be rendered in an electrically-connected state again. In this case, the state machine 17 may disconnect the bus (cable) which has not been disconnected. For example, a topology as shown in FIG. 7a is intentionally constructed. A node A3 is connected to a node B3 via a bus cable 1p. A node C3 is connected to the node B3 via a bus cable 1q. The node B3 is connected to a node D3 via three bus cables 1r, is and it. The node D3 is connected to a node G3 via a bus cable 1u and is connected to a node F3 via a bus cable 1v. The node F3 is connected to a node E3 via a bus cable 1w. Note that the bus cable 1r is set as a main path between the nodes B3 and D3, and the ports 18 of the nodes B3 and D3 to which the bus cable 1r is connected are given a high priority.

When the nodes A3 to G3 are rendered ON, bus resetting starts at the node C3. The diagnosis packet SP is transferred, as shown in, for example, FIG. 7b, from the node C3 to the node B3, passing the node B3, the node D3, the node G3 and the node D3 in order. During this period, the diagnosis packet SP is sent to the node D3 from the node B3, passing the port 18 (bus cable 1r) that has a high priority, and returns to the node B3 from the node D3, passing, for example, the bus cable 1t.

Then, the state machine 17 of the node B3 determines that two ports 18 which are associated with transmission and reception of the diagnosis packet SP form a loop, and electrically disconnects the bus cable 1t of the receiving port 18.

This disconnection initiates the second bus resetting with the node B3 as the origin. Then, as shown in FIG. 7c, for example, the diagnosis packet SP is transferred to the node B3 through the port 18 (bus cable 1r) that has a high priority. Then, the diagnosis packet SP is transferred to the node D3, the node F3, the node E3, the node F3 and the node D3 and returns to the node B3 via the bus cable 1s.

Then, the state machine 17 of the node B3 determines that the ports 18 which are associated with transmission and reception of the diagnosis packet SP form a loop, and electrically disconnects the bus cable 1s of the receiving port 18. Accordingly, a topology with a loop canceled is constructed. Further, the port 18 (bus cable 1r) that has a high priority remains connected.

Following the disconnection of the bus cable 1s, bus initialization, tree identification and self identification are properly completed. As a result, normal packet transfer becomes possible among the individual nodes A3 to G3.

When the bus cable 1r (main path), for example, is physically disconnected thereafter, the state machine 17 of the node B3 restores the bus cable 1s again to the connected state (FIG. 7d). This can permit packet transfer between the node B3 and the node D3 without the user's reconnection of the bus. If a loop is intentionally formed in advance between the node B3 and the node D3 that are difficult to be maintained, for example, packet transfer is restarted in a short period of time even when an abnormality occurs between the nodes.

In each of the embodiments, program data which describes the process in the Tx state 32 (flowchart in FIG. 4) may be recorded on a recording medium. In this case, the port controller 21 is controlled by a computer which can execute the recording medium.

In each of the embodiments, instead of the initiate node sending the first diagnosis packet SP, another node may transmit the first diagnosis packet SP.

Although the embodiments of the present invention has been described in association with the diagrams, the present invention is not limited to the above and may be modified within the recitation of the appended claims and equivalence thereof.

What is claimed is:

1. A method of constructing a topology having a plurality of nodes, the method comprising:
   diagnosing the presence of a loop connection of the topology by determining whether a process has been stacked for a predetermined time in a state in which a first node does not receive a parent notify signal; and
   disconnecting a part of the loop connection based on the diagnosis result, wherein said diagnosing includes:
      after the predetermined time elapses, transmitting a diagnosis signal from one port of the first node and marking said one port that transmits the diagnosis signal;
      marking as a received port of a receiving node that receives the diagnosis signal;
      transmitting the diagnosis signal from other port of the receiving node other than the receiving port;
      when an unmarked port remains in the first node, transmitting the diagnosis signal from said unmarked port of the first node;
      when the diagnosis signal transmitted from said one port of the first node is returned to other port of the first node, determining that said one port and said other port of the first node are on a loop connection; and
      when the diagnosis signal transmitted from said one port of the first node is returned to said one port of the first node, determining that said one port of the first node is not on a loop connection.

2. The method according to claim 1, wherein the determining the presence of the loop connection of the topology includes determining whether a process in a tree ID state has been stacked for a predetermined time.

3. The method according to claim 1, wherein the plurality of nodes include first and second nodes, each of which has a plurality of ports including first and second ports, and the diagnosis includes:
   transmitting the diagnosis signal from the first port of the first node;
   marking the first port of the first node;
   marking the first port of the second node when the diagnosis signal is supplied to the first port of the second node;
   transmitting the diagnosis signal from the second port of the second node;
   marking the second port of the second node; and
   determining that a loop connection is formed by the first port and second port of the first node when the diagnosis signal is supplied to the second port of the first node, whereby when the loop connection is formed, the disconnection step includes electrical disconnection of one of the first port and second port of the first node.

4. The method according to claim 1, wherein each of the nodes has a plurality of ports to be connected to other nodes, and the disconnection includes electrical disconnection of at least one port on the loop.

5. The method according to claim 3, wherein the first node is an initiate node.

6. The method according to claim 3, further comprising setting a priority order for the plurality of ports in advance, and wherein when the second node has a plurality of unmarked ports, each of the transmitting steps includes transmission of the diagnosis signal from that port which has a high priority.

7. The method according to claim 3, further comprising, when an abnormality occurs at connection between those nodes which have not been disconnected in the disconnection step, restores the disconnected port and disconnects an arbitrary one of the ports which have not been disconnected.

8. The method according to claim 7, further comprising connecting the plurality of nodes in advance in such a way as to form a loop connection.

9. The method according to claim 1, further comprising performing bus resetting with a disconnected node as a base point after the disconnection step.

10. The method according to claim 1, wherein when the loop connection exists, each step is executed under software control.

11. An interface circuit provided at each of a plurality of nodes connected to one another by bus cables, the interface circuit comprising:
   ports to be connected to the bus cables;
   a state machine for diagnosing that a loop connection exists when a process in a predetermined state has been stacked for a predetermined time in a state in which a first node dose not receive a parent notify signal, wherein when a diagnosis signal transmitted from one of the ports of the first node returns to said one of the ports of the first node, the state machine determines that said one port is not on a loop connection, and wherein when a diagnosis signal transmitted from one of the ports of the first node returns to other port of the first node, the state machine determines that said one port and said other port are on a loop connection; and
   a port controller, connected to the ports and the state machine, for, electrically disconnecting said one of the port or said other port when the state machine has diagnosed that a loop connection exists.

12. The interface circuit according to claim 11, wherein the ports include a first port and a second port, and wherein when the interface circuit transmits the diagnosis signal from the first port and receives the diagnosis signal from the second port, the interface circuit determines that the first port and the second port form a loop, and the port controller electrically disconnects one of the first and second ports.

13. The interface circuit according to claim 12, wherein when the interface circuit transmits the diagnosis signal from the first port and receives the diagnosis signal from the first port, the interface circuit determines that the first port and the second port do not form a loop, and maintains states of the first and second ports.

14. The interface circuit according to claim 12, wherein the interface circuit is provided at an initiate node.

15. The interface circuit according to claim 11, wherein the interface circuit has a plurality of ports and the state machine sets a priority order for the plurality of ports and transmits the diagnosis signal from that port on the basis of said priority order.

16. The interface circuit according to claim 15, wherein when an abnormality occurs at connection associated with those ports which have not been disconnected after a port was disconnected, the interface circuit restores the disconnected port and disconnects the ports which have not been disconnected.

17. The interface circuit according to claim 16, wherein after a port was disconnected, the interface circuit executes bus resetting with the disconnected node as a base point.

18. The method according to claim 1, wherein said disconnecting includes electrically disconnecting said one port or said other port of the first node to eliminate the loop connection.

* * * * *

UNITED STATES PATENT AND TRADEMARK OFFICE
CERTIFICATE OF CORRECTION

PATENT NO. : 7,317,690 B2  Page 1 of 1
APPLICATION NO. : 09/968519
DATED : January 8, 2008
INVENTOR(S) : Kenji Oi et al.

It is certified that error appears in the above-identified patent and that said Letters Patent is hereby corrected as shown below:

Column 10, Line 53, change "dose" to --does--.

Signed and Sealed this

Tenth Day of June, 2008

JON W. DUDAS
*Director of the United States Patent and Trademark Office*